J. H. FAIRBANK.
Balanced-Valve.
No. 216,664.  Patented June 17, 1879.
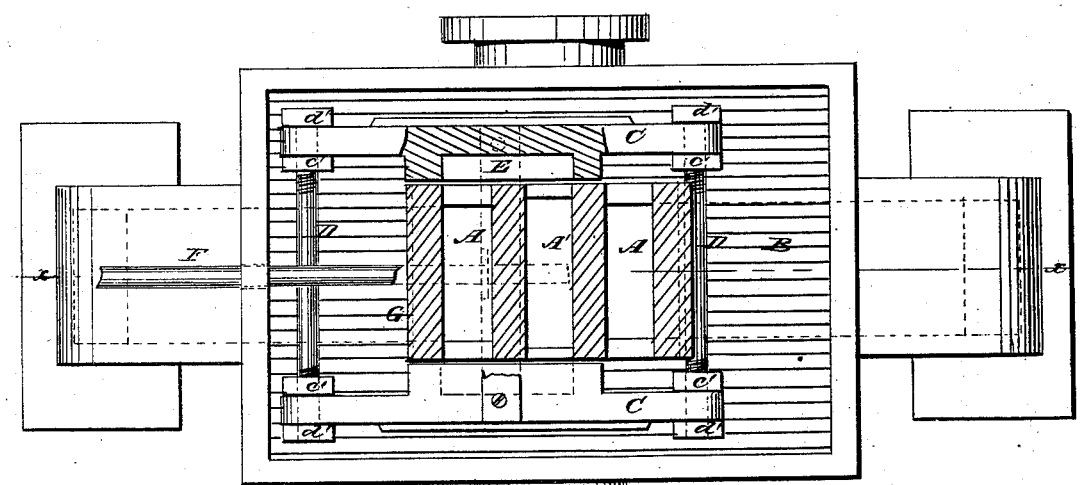
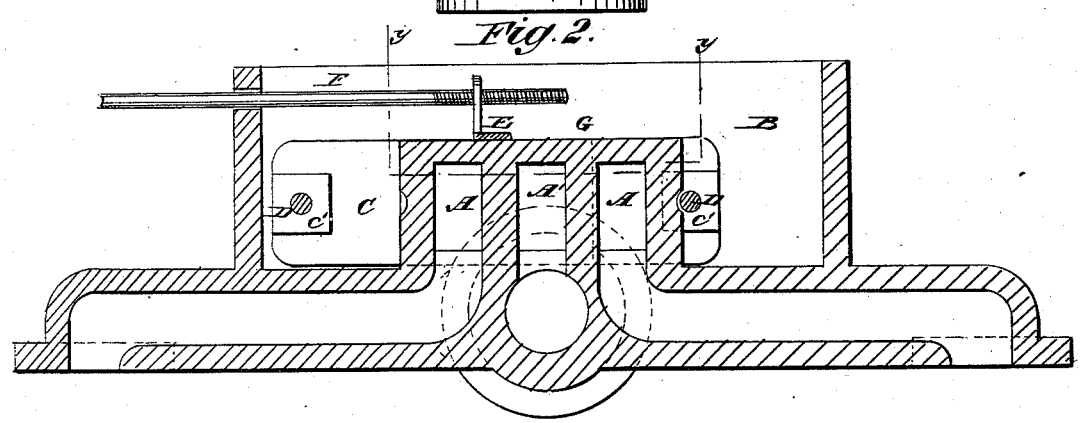
WITNESSES:
Francis McArdle
C. Sedgwick
INVENTOR:
J. H. Fairbank
BY [signature]
ATTORNEYS.

UNITED STATES PATENT OFFICE.

JOHN H. FAIRBANK, OF McKEESPORT, PENNSYLVANIA, ASSIGNOR TO HIMSELF AND JOHN A. RHODES, OF SAME PLACE.

IMPROVEMENT IN BALANCED VALVES.

Specification forming part of Letters Patent No. 216,664, dated June 17, 1879; application filed March 27, 1879.

*To all whom it may concern:*

Be it known that I, JOHN HENRY FAIRBANK, of McKeesport, in the county of Allegheny and State of Pennsylvania, have invented a new and Improved Balanced Slide-Valve, of which the following is a specification.

Figure 1 is a sectional plan of the steam-chest, with cover removed to show the valve, on line $y\,y$, Fig. 2. Fig. 2 is a longitudinal section of the same on line $x\,x$, Fig. 1.

Similar letters of reference indicate corresponding parts.

The object of this invention is to provide a steam-engine valve that the steam-pressure shall not perceptibly press upon the valve-seat.

The invention consists in the extension of the steam and exhaust ports A A' of an engine-cylinder up into the steam-chest B, and giving them lateral openings, thus forming a parallelogrammic projection, G, whose longer sides form the valve-seats of the two slide-valves C C, that are adjustably secured against the valve-seats by the screw-bolts and nuts D D and $d'\,d'$, respectively, while the nuts $c'\,c'$ are for the purpose of further steadying the valves when in motion, as well as for aiding in their adjustment.

It will be seen that these valves are prolonged at each end into lugs, through which the bolts D D pass. This is in order to allow room for the full motion of the valves without bringing the bolts in contact with the projections which form the valve-seats.

The yoke E, the ends of which are firmly secured to the center of the upper edge of each valve, further assists in holding them to the valve-seats against the steam-pressure, and affords the desired connection with the valve-stem F, that is adjustable in it by means of the screw-threads cut on its end.

When in action the rod, yoke, valves, and their bolts and nuts reciprocate in the direction of the axis of the rod, and as the steam presses only outwardly against the valves a minimum of power is required to move them.

The advantages of this valve over others lie in its cheapness and simplicity, its fewer number of parts, and the ease with which it can be adjusted or loosened or tightened upon the valve-seats.

The block or projection G, containing the exhaust and valve seats, may be cast on side pipes in new engines, or may be cast separately and with a flange for attachment to old engines.

Having thus described my invention, I claim as new and desire to secure by Letters Patent—

The sliding valves C C, constructed as shown and described, and adjustably secured together by the rods D and nuts $c'\,d'$, the yoke E, having a screw-threaded hole, and the screw-threaded valve-stem F, in combination with the projection G, extended into the steam-chest B, substantially as and for the purpose set forth.

JOHN HENRY FAIRBANK.

Witnesses:
SAML. E. CAROTHERS,
JAMES H. BERRY.